US005110099A

United States Patent [19]

Shirakawa

[11] Patent Number: 5,110,099

[45] Date of Patent: May 5, 1992

[54] HYDRAULIC CLAMP WITH DIRECT OPERATED CLAMPING-MEMBER

[75] Inventor: Tsutomu Shirakawa, Kobe, Japan

[73] Assignee: Kabushiki Kaisha Kosmek, Hyogo, Japan

[21] Appl. No.: 703,834

[22] Filed: May 21, 1991

[30] Foreign Application Priority Data

Jun. 5, 1990 [JP] Japan .................................. 2-147560

[51] Int. Cl.[5] ................................................ B23Q 3/08

[52] U.S. Cl. .......................................... 269/25; 269/93

[58] Field of Search .............................. 269/20, 24-25, 269/27, 32, 249, 91, 93-94; 254/93 R

[56] References Cited

U.S. PATENT DOCUMENTS 4,174,828 11/1979 Bergman .............................. 269/20
4,620,695 11/1986 Vanistendael ......................... 269/32

FOREIGN PATENT DOCUMENTS 263017 12/1988 Fed. Rep. of Germany ........ 269/20
63-38932 3/1989 Japan .

*Primary Examiner*—Robert C. Watson
*Attorney, Agent, or Firm*—Bacon & Thomas

[57] ABSTRACT

In a hydraulic clamp with a direct operated clamping-member, a piston (13) is so inserted into a cylinder bore (11) formed in an upper portion of a housing (4) as to be slidable in the vertical direction. A peripheral wall (11*a*) of the cylinder bore (11) is projected downwardly and fixedly secured to a lower portion of the housing (4). An opening (12) is so formed in the lower portion of the peripheral wall (11*a*) as to face a fixed object (2) such as a metal mould. A clamping actuation oil chamber (15) is formed above the piston (13). A spring accommodation bore (21) is formed upwardly from below in a clamping-member (5) which protrudes downwardly from the piston (13), and an unclamping spring (23) is inserted into the spring accommodation bore (21).

9 Claims, 3 Drawing Sheets

HYDRAULIC CLAMP WITH DIRECT OPERATED CLAMPING-MEMBER

BACKGROUND OF THE INVENTION

1. Field of the Invention

The present invention relates to a hydraulic clamp adapted to press and fix a fixed object such as a metal mould, a work pallet and the like onto a fixing table of a manufacturing machine such as an injection moulding machine, a machining center and so on, and more specifically to a hydraulic clamp of the type in which a clamping-member is linearly actuated by means of a hydraulic piston.

2. Prior Art

As such a hydraulic clamp, there has been provided the one illustrated in FIGS. 6 and 7, which is known by the inventor of the present invention and is constructed as follows.

A housing 104 of a hydraulic clamp 103 is formed in a horizontalized U-like configuration, while a cylinder bore 111 and a spring accommodation bore 121 are vertically formed in an overhang portion 140 of its front upper portion. A piston 113 is so inserted into the cylinder bore 111 so as to be slidable in an oil-tight manner in the vertical direction. A clamping actuation oil chamber 115 is formed above the piston 113 within the cylinder bore 111. A clamping-member 105 projects downwardly from the piston 113. An unclamping spring 123 is mounted externally around the clamping-member 105 within the spring accommodation bore 121. When the piston 113 is actuated downwardly by means of a hydraulic pressure within the clamping actuation oil chamber 115, the clamping-member 105 serves to press and fix a fixed portion 102*a* of the metal mould 102 from above.

There are, however, the following problems associated with the above-mentioned prior art.

(a) In order to make the housing 104 sufficiently bearable against a clamping reaction force transmitted to the overhang portion 140 from the clamping-member 105, it is necessary to increase a rigidity of a column portion 141. As a result, the housing 104 needs to be made larger in dimension and heavier in weight.

(b) Since a height dimension of the cylinder bore 111 is limited by a height dimension of the spring accommodation bore 121, an allowed stroke S of the piston 113 must be short. Therefore, an adjustable range R of a clamping thickness obtained by subtracting a minimum clamping thickness t from a maximum clamping thickness T is small.

SUMMARY OF THE INVENTION

It is an object of the invention to make a hydraulic clamp small in dimension and light in weight as well as to enlarge an adjustable range of a clamping thickness.

For accomplishing the above-mentioned object, a hydraulic clamp is constructed as follows.

A peripheral wall of a cylinder bore formed in an upper portion of a housing is projected downwardly and is fixedly secured to a lower portion of the housing. An opening facing a metal mould is formed in the lower portion of the peripheral wall. A clamping actuation oil chamber is formed above a piston inserted into the cylinder bore as well as a clamping-member is projected downwardly from the piston and a spring accommodation bore is formed upwardly in the clamping-member from below. An unclamping spring inserted into the spring accommodation bore is received by means of both the upper wall of the spring accommodation bore i.e. a lower surface of the piston and the lower portion of the housing.

According to the present invention, the following advantages can be provided.

(a) Since the peripheral wall of the cylinder bore is projected downwardly and fixedly secured to the lower portion of the housing, it becomes possible to omit the column portion of the conventional embodiment from the housing. Therefore, the housing can be made small in dimension and light in weight.

(b) Since the spring accommodation bore is formed in the clamping-member, the height dimension of the cylinder bore is not limited by the height dimension of the spring accommodation bore. Therefore, it is possible to enlarge the adjustable range of the clamping thickness by enlarging the allowed stroke of the piston.

Accordingly, it becomes possible to make the hydraulic clamp small in dimension and light in weight as well as to enlarge the adjustable range of the clamping thickness.

BRIEF DESCRIPTION OF THE DRAWINGS

The invention is further described by way of illustrative examples with reference to the annexed drawings, in which:

FIG. 1 is a vertical sectional view of a hydraulic clamp;

FIG. 2 is a partial sectional plan view of the hydraulic clamp;

FIG. 3 is a left side view of the hydraulic clamp;

FIG. 4 is a view corresponding to FIG. 1;

FIG. 5 is a view corresponding to FIG. 2;

FIG. 6 is a view corresponding to FIG. 1; and

FIG. 7 is a view corresponding to FIG. 3.

DESCRIPTION OF THE PREFERRED EMBODIMENTS

First Embodiment

Figure 2:
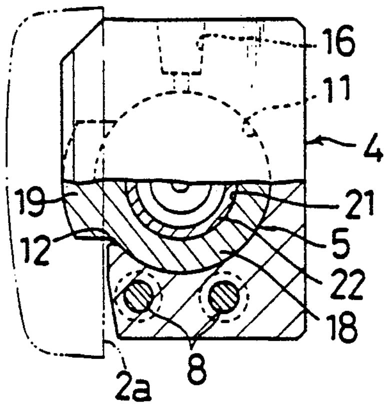
FIGS. 1 through 3 show a first embodiment of the present invention.
Figure 3:
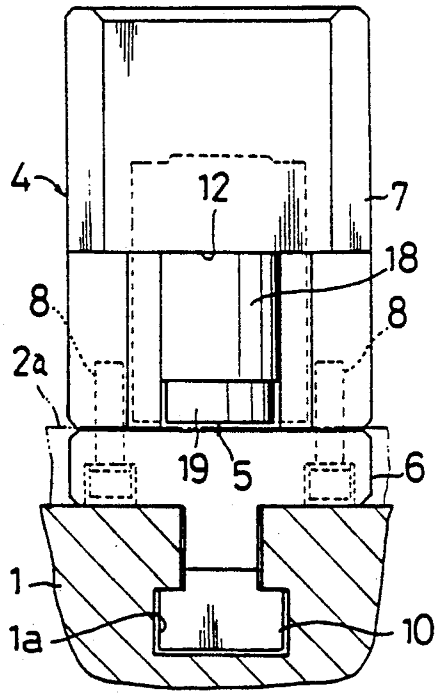
Figure 1:
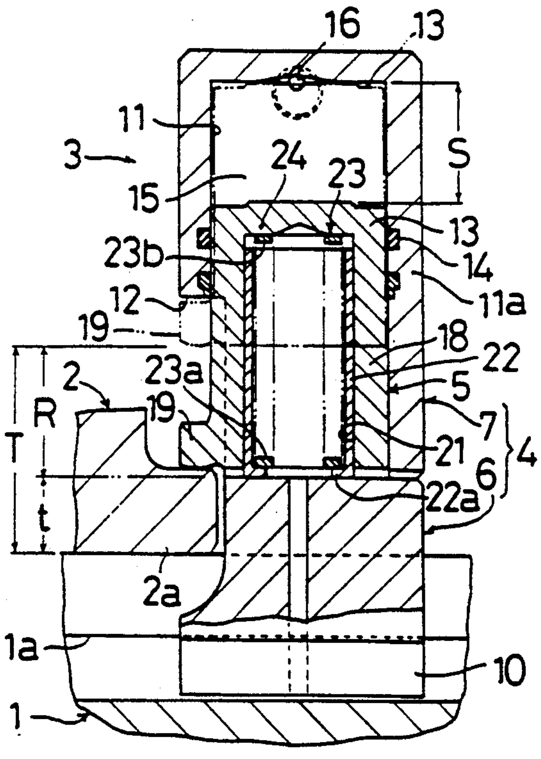

FIGS. 1 through 3 show a first embodiment.

A metal mould (a fixed object) 2 placed on an upper surface of a fixing table 1 is adapted to be fixedly secured by means of a hydraulic clamp 3. The hydraulic clamp 3 is adapted to press and fix a fixed portion 2*a* of the metal mould 2 at a clamping area by means of a clamping-member 5 downwardly operated within a housing 4 thereof.

The housing 4 is formed in an elongate configuration having an upper first end and a lower second end and is constructed by integrally securing a lower housing 6 and an upper housing 7 by means of four bolts 8. A T-shaped leg portion 10 of the lower housing 6 is adapted to be inserted into a T-shaped groove 1*a* of the fixing table 1. A cylinder bore 11 is vertically formed in the upper housing 7. An opening 12 is formed in such a portion of the peripheral wall 11*a* (a left portion in FIG. 1) of the cylinder bore 11 as to face the metal mould 2 at a clamping. A piston 13 is so inserted into the cylinder bore 11 so as to be slidable in an oil-tight manner in the vertical direction through a packing 14. A clamping actuation oil chamber 15 is formed above the piston 13, and a pressurized oil supply/discharge port 16 is opened in the clamping actuation oil chamber 15.

The clamping-member 5 comprises a cylindrical column portion 18 direct protruded downwardly from the piston 13 and a clamping portion 19 projected from the lower portion of the column portion 18 into the aforementioned opening 12. A spring accommodation or securing bore 21 is formed upwardly in the clamping-member 5 from below. A guide sleeve 22 is so inserted into the spring accommodation bore 21 as to be relatively slidable in the vertical direction, and an unclamping spring 23 composed of a compression spring is inserted into the guide sleeve 22. A lower end 23*a* of the unclamping spring 23 is received by the lower housing 6 through a lower flange 22*a* formed in a second end of the guide sleeve 22. An upper end 23*b* of the unclamping spring 23 is brought into resilient contact with a spring retaining seat 24 formed in an upper wall of the spring accommodation bore 21.

As illustrated in FIG. 1, the above-mentioned hydraulic clamp 3 operates as follows.

At the time of unclamping the metal mould 2, a pressurized oil within the clamping actuation chamber 15 is discharged from the pressurized oil supply/discharge port 16. Thereupon, as indicated by the alternate long and two short dashes line, the piston 13 and the clamping-member 5 are pressed at an upper unclamping position by means of a resilient force of the unclamping spring 23.

At the time of clamping the metal mould 2, the pressurized oil is supplied from the pressurized oil supply/discharge port 16 to the clamping actuation chamber 15. Thereupon, as indicated by a solid line, the piston 13 is downwardly actuated by means of the hydraulic pressure within the clamping actuation chamber 15, and the clamping portion 19 of the clamping-member 5 lowering together therewith serves to press from above the fixed portion 2*a* inserted into the aforementioned opening 12. Incidentally, the symbol T designates a maximum clamping thickness, and the symbol t designates a minimum clamping thickness. Further, the symbol R designates an adjustable range of the clamping thickness, in other words, an allowed stroke S of the piston 13.

According to the above-mentioned first embodiment, the following advantages can be provided.

Figure 6:
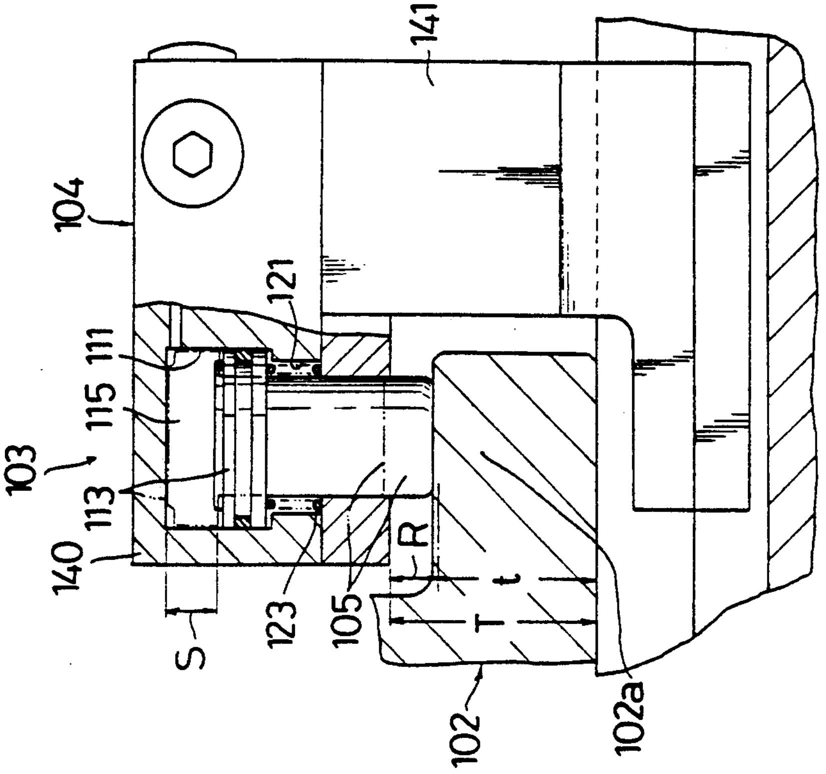
Fig.6 PRIOR ART
FIGS. 6 and 7 show a conventional embodiment.
Figure 7:
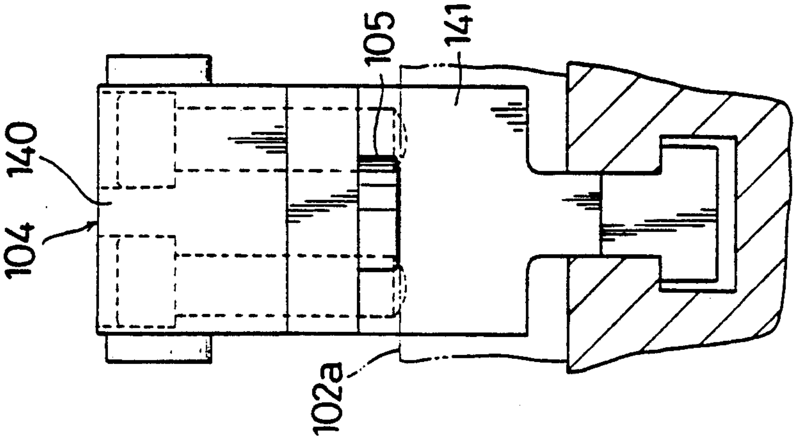
Fig.7 PRIOR ART

Since the peripheral wall 11*a* of the cylinder bore 11 formed in the upper housing 7 extends downward substantially vertically and is fixedly secured to the lower housing 6, the column portion 141 employed in the conventional embodiment (refer to FIGS. 6 and 7) can be omitted. Therefore, the housing 4 can be made small in dimension and light in weight.

Since the spring accommodation bore 21 is formed in the interior of the clamping-member 5, the height dimension of the cylinder bore 11 is not limited by the height dimension of the spring accommodation bore 21. Therefore, the adjustable range R of the clamping thickness can be enlarged by enlarging the allowed stroke S of the piston 13.

Since the unclamping spring 23 is inserted into the guide sleeve 22, the piston 13 and the clamping-member 5 can be prevented from being interfered therewith by an outer peripheral portion of the spring 23 so as to be smoothly slidable in the vertical direction.

Since the clamping portion 19 of the clamping-member 5 protrudes radially outwardly from the column portion 18, a clamping press area can be enlarged so that a pressure per unit area at the time of clamping can be decreased. As a result, it is possible to prevent damage to the fixed portion 2*a* of the metal mould 2.

Second Embodiment

Figure 5:
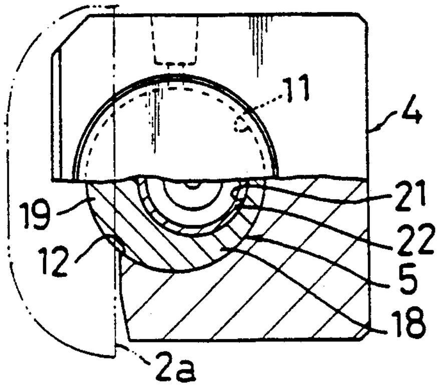
FIGS. 4 and 5 show a second embodiment of the present invention.
Figure 4:
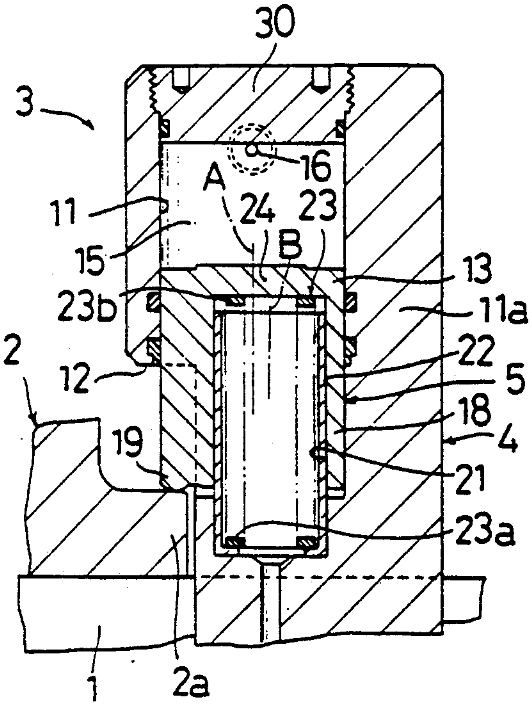

FIGS. 4 and 5 show a second embodiment, in which component members having the same constructions as those employed in the above-mentioned first embodiment are, in principle, designated by the same symbols.

The housing 4 is formed as one piece in the vertical direction and has an upper wall, which is formed by a cover bolt 30, of the clamping actuation oil chamber 15. A central longitudinal axis B of the spring accommodation bore 21 is offset toward the right side relative to the longitudinal sliding axis A of the piston 13, and the lower portion of the guide sleeve 22 is fitted into the housing 4. Further, the clamping portion 19 of the clamping-member 5 is so formed as to have the same diameter as that of the column portion 18.

According to the second embodiment, the following advantages can be provided. Since the axis B of the spring accommodation bore 21 is offset relative to the axis A of the piston 13, the guide sleeve 22 can prevent the piston 13 from rotating about the axis A. Therefore, the rotation preventing construction of the piston 13 can be simplified. Additionally, by displacing the axis B of the spring accommodation bore 21 to the right side so as to enlarge the pressing area of the clamping portion 19, a pressure per unit area at the time of clamping can be decreased.

Incidentally, the above-mentioned respective embodiments may be modified as follows.

The hydraulic clamp 3 may have the clamping-member 5 disposed in such a posture as to horizontally or obliquely operate instead of in such a posture as to vertically operate.

By omitting the guide sleeve 22, the unclamping spring 23 may be inserted directly into the spring accommodation bore 21.

As many different embodiments of the invention will be obvious to those skilled in the art, some of which have been disclosed or referred to herein, it is to be understood that the specific embodiments of the present invention as presented herein are intended to be by way of illustration only and are not limiting on the invention, and it is to be understood that such embodiments, changes, or modifications may be made without departing from the spirit and scope of the invention as set forth in the claims appended hereto.

What is claimed is:

1. A hydraulic clamp with a direct operated clamping member comprising:
   - a housing having a first end portion and a second end portion;
   - a cylinder bore formed in the first end portion of said housing extending towards said second end portion;
   - means for rigidly connecting said first and second end portions of said housing;
   - a piston slidably located within and in oil tight relationship with said cylinder bore and moveable between clamping and unclamping positions;
   - a clamping actuation oil chamber located within said cylinder bore between said first end portion of said housing and said piston;
   - a moveable clamping member secured to said piston for movement therewith and extending toward the second end portion of said housing, said clamping member including a clamping portion facing a clamping area;

a spring receiving bore formed in said clamping member and extending parallel to the direction of motion of said clamping member; and an unclamping spring means located within said spring receiving bore for biasing said piston and clamping member in an unclamping direction;

said housing including an extension of the peripheral wall of said cylinder bore between said first and second end portions;

said clamping member comprising an extension of said piston and being slidably disposed in said extension of the peripheral wall of said bore, said extension of the peripheral wall of said cylinder bore including an opening facing said clamping area;

said clamping portion extending through said opening at least when in a clamping position.

2. A hydraulic clamp as set forth in claim 1, further comprising:

a guide sleeve having a first end that is open and extends into said spring receiving bore and a second end engaging said second end portion, said sleeve retained by said second end portion against movement away from said first end portion;

said unclamping spring being located within said guide sleeve and extending into said spring receiving bore through said guide sleeve first end.

3. A hydraulic clamp as set forth in claim 2, wherein said guide sleeve includes means for retaining said spring against displacement toward said second end portion.

4. A hydraulic clamp as set forth in claim 1, wherein said spring receiving bore includes an associated central longitudinal axis (B) which is offset toward a side opposite said opening relative to a central longitudinal axis (A) of said piston.

5. A hydraulic clamp with a direct operated clamping member comprising:

a housing having a first end portion and a second end portion;

a cylinder bore formed in the first end portion of said housing extending towards said second end portion;

means for rigidly connecting said first and second end portions of said housing;

a piston slidably located within and in oil tight relationship with said cylinder bore and moveable between clamping and unclamping positions;

a clamping actuation oil chamber located within said cylinder bore between said first end portion of said housing and said piston;

a moveable clamping member secured to said piston for movement therewith and extending toward the second end portion of said housing, said clamping member including a clamping portion facing a clamping area;

a spring receiving bore formed in said clamping member and extending parallel to the direction of motion of said clamping member;

an unclamping spring means located within said spring receiving bore for biasing said piston and clamping member in an unclamping direction;

a guide sleeve having a first end that is open and extends into said spring receiving bore and a second end engaging said second end portion, said sleeve retained by said second end portion against movement away from said first end portion;

said unclamping spring being located within said guide sleeve and extending into said spring receiving bore through said guide sleeve first end.

6. A hydraulic clamp as set forth in claim 5, wherein said guide sleeve includes means for retaining said spring against displacement toward said second end portion.

7. A hydraulic clamp as set forth in claim 6, wherein said means for rigidly connecting said first and second end portions of said housing comprises an extension of the peripheral wall of said cylinder bore.

8. A hydraulic clamp as set forth in claim 7, where said clamping member comprises an extension of said piston and is slidably disposed in said extension of the peripheral wall of said bore, said extension of the peripheral wall of said cylinder bore including an opening facing said clamping area; said clamping portion extending through said opening at least when in a clamping position.

9. A hydraulic clamp as set forth in claim 8, wherein said spring receiving bore includes an associated central longitudinal axis (B) which is offset toward a side opposite said opening relative to a central longitudinal axis (A) of said piston.

* * * * *